United States Patent [19]
Ichikawa

[11] Patent Number: 5,333,070
[45] Date of Patent: Jul. 26, 1994

[54] APPARATUS FOR ADJUSTING HUE, CHROMINANCE, AND LUMINANCE OF A VIDEO SIGNAL USING MATRIX CIRCUITS

[75] Inventor: Koji Ichikawa, Tokyo, Japan
[73] Assignee: Fuji Photo Film Co., Ltd., Kanagawa, Japan
[21] Appl. No.: 857,262
[22] Filed: Mar. 25, 1992
[30] Foreign Application Priority Data
  Apr. 5, 1991 [JP] Japan .................... 3-072708
[51] Int. Cl.$^5$ .............................................. H04N 9/64
[52] U.S. Cl. .................... 358/518; 358/520; 348/645; 348/652
[58] Field of Search .............. 358/75, 80, 28, 27, 358/30, 500, 501, 515, 518, 520, 522; H04N 9/64

[56] References Cited
U.S. PATENT DOCUMENTS
| | | | |
|---|---|---|---|
| 3,689,689 | 9/1972 | Weitzsch | 358/30 |
| 4,694,330 | 9/1987 | Tanaka | 358/27 |
| 4,768,082 | 8/1988 | Hiratsuka | 358/80 |
| 4,788,586 | 11/1988 | Eckenbrecht | 358/28 |
| 4,812,902 | 3/1989 | Fuchsberger | 358/80 |
| 4,812,903 | 3/1989 | Wagensonner | 358/80 |
| 4,959,659 | 9/1990 | Sasaki | 358/75 |

FOREIGN PATENT DOCUMENTS
2227899  8/1990  United Kingdom ......... H04N 9/64

*Primary Examiner*—James J. Groody
*Assistant Examiner*—Chris Grant

[57] ABSTRACT

Disclosed herein is an apparatus for carrying out color correction on a video signal. The apparatus basically comprises a Y/C separating circuit for separating the video signal into a luminance signal and a color signal, a decoder for decomposing these signals into color separation signals, three three-row/three-column type color-correcting matrix circuits for electrically processing the color separation signals for color correction, an A/D converter circuit for converting the so-processed signals into digital signals, a frame memory for storing the digital signals therein as data, a correction circuit and a printer head. By using the apparatus referred to above, a user can emphatically perform correction on the hue, chroma and luminance of each of specific colors. Thus, the user can adjust the quality of an image with extreme ease.

4 Claims, 2 Drawing Sheets

APPARATUS FOR ADJUSTING HUE, CHROMINANCE, AND LUMINANCE OF A VIDEO SIGNAL USING MATRIX CIRCUITS

BACKGROUND OF THE INVENTION

1. Field of the Invention

The present invention relates to an apparatus for electrically processing, for color correction, a video signal used for a video printer.

2. Description of the Background Art

A video printer prints out color images, e.g. images taken by video cameras or images form public broadcast television. Not all of the images, however, have necessarily been obtained under ideal photographic conditions. Some images are dark due to shortage of light, for example. Others have poorly-balanced colors, or insufficient chrominance. It is therefore necessary to improve quality of the color images through an appropriate color image treatment.

The color image treatment in video printers includes 2 stages: image adjustment applied to a video signal and color correction for respective color separated images.

Firstly, a user of the video printer can adjust the hue and/or chrominance of the color images by manipulating a 'TINT' and/or a 'SATURATION' knob, just like in a color television receiver. The hue of the color image is altered by shifting the relative phase between the color sub-carrier and color carrier signals at the time of color demodulation. The chrominance is altered by changing the amplitude ratio between the color sub-carrier and color carrier signals. With this adjusting method, the hue and/or chrominance of every color component in the image are changed together. A specific color cannot be selectively adjusted regarding its hue and/or chrominance.

After the hue and/or chrominance have been adjusted as described above, the video signal is subjected to color separation by a luminance/chrominance separation circuit and a decoder circuit, and RGB (Red, Green, Blue) signals are obtained. Respective color-separated signals are then subjected to masking treatment by a matrix conversion circuit for color correction.

Inks used for the video printer include quantities of unnecessary light-absorbing dyes and therefore develop a tint or hue different from the ideal one. If the color separated signals are supplied to the printer without color correction, a vivid color image comparable to the picture on a color TV receiver cannot be reproduced due to the unnecessary dyes included in the ink. The above-mentioned color correction for the color-separated signals is therefore necessary. However, the user of the video printer cannot alter the constants in the matrix conversion circuit as he/she desires, because these constants are permanent parameters of the video printer determined in its design stage.

On the other hand, colors of skin S and green f are important colors for which man has an intrinsic feeling and personal preferences. It is therefore desirable for the video printer to be capable of adjusting the hue, chrominance, and luminance in the vicinity of the colors S and f, independently. Conventional video printers, however, have no such a capability, for the reasons explained above.

SUMMARY OF THE INVENTION

It is therefore a principal object of the present invention to provide an apparatus for electrically processing a video signal for color correction, of a type wherein a user can freely adjust chroma, hue and brightness of each of specific colors with an extremely simple circuit configuration.

It is another object of the present invention to provide an apparatus for electrically processing a video signal for color correction, which includes a first color-correcting matrix circuit for converting a signal of an RGB coordinate system based on an input video signal into a signal of an SfY coordinate system comprising a skin color S, a green color f, and a luminance Y, a second color-correcting matrix circuit for correcting the converted signal so that the colors S and f in the SfY coordinate system provide desired hue, chrominance, and luminance, respectively, the second color-correcting matrix circuit including a coefficient adjusting circuit whereby matrix coefficients of the second color-correcting matrix circuit may be altered in correcting the converted signals; and a third color-correcting matrix circuit for converting the processed signal into a signal of the RGB coordinate system.

It is a further object of the present invention to provide an apparatus for processing a video signal for color correction wherein the first through third color-correcting matrix circuits comprise three-row/three-column type matrices.

It is a still further object of the present invention to provide an apparatus for processing a video signal for color correction wherein the third color-correcting matrix circuit comprises a matrix indicative of the inverse of that of the first color-correcting matrix circuit.

It is a still further object of the present invention to provide an apparatus for processing a video signal for color correction wherein the second color-correcting matrix circuit outputs the same signal as an input signal when an achromatic signal is the output.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The above and other objects, features and advantages of the present invention will become apparent The above and other objects, features and advantages of the present invention will become apparent from the following description taken in conjunction with the accompanying drawings, in which a preferred embodiment of the present invention is shown by way of illustrative example only, and thus is not limitative of the present invention and wherein:

FIG. 1 is a block diagram showing an apparatus for electrically processing a video signal for color correction, according to one embodiment of the present invention; and FIG. 2 is a diagram for describing color-correction controls employed in the apparatus shown in FIG. 1.

DETAILED DESCRIPTION OF THE PREFERRED EMBODIMENTS

Figure 1:
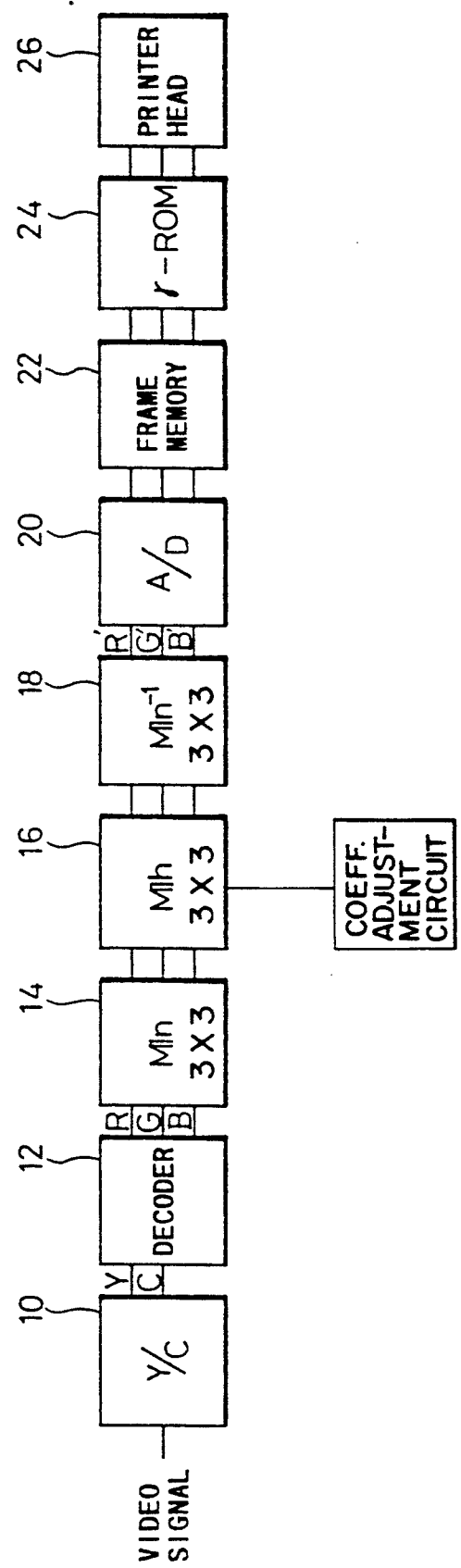

Referring to FIG. 1, a video signal input to a video printer is first supplied to a Y/C separating circuit 10 for separating the video signal into a luminance signal Y and a chrominance or color signal C. The luminance signal Y and the chrominance signal C separated by the Y/C separating circuit 10 are decomposed into color separation signals (R, G, B) by a decoder 12. Incidentally, when the video signal to be input to the video printer is of an RGB signal, it is unnecessary to provide the Y/C separating circuit 10 and the decoder 12.

The color separation signals (R, G, B) are processed for color correction by three-row/three-column type color-correcting matrix circuits 14, 16, 18.

The signals (R', G', B') subjected to the color correction are digitized by an analog-digital (A/D) converter circuit 20. Then, the so-digitized signals are stored as data in a frame memory 22, and are then subjected to an electrical correcting process of a correction circuit 24 so as to be output therefrom, followed by transfer to a printer head 26. Thereafter, the printer head 26 is activated to reproduce a color image on the basis of the signals thus corrected.

The color-correcting matrix circuits 14, 16, 18 will now be described in detail. Each of the color-correcting matrix circuits 14, 16, 18 is of a three-row/three-column type matrix circuit, which performs color correction.

Then, a matrix Mc is established as follows:

$$\begin{bmatrix} R' \\ G' \\ B' \end{bmatrix} = Mc \begin{bmatrix} R \\ G \\ B \end{bmatrix} \quad (1)$$

where the color separation signals prior to the color correction are represented by (R, G, B) and the color separation signals subsequent to the color correction are represented by (R', G', B')

Then, the matrix Mc will be defined by:

$$Mc = Mn^{-1} \times Mh \times Mn \quad (2)$$

where the matrix Mn is used to convert an RGB coordinate system into an SfY coordinate system comprising a skin-color axis (S axis), a green-color axis (f axis) and a luminance axis (Y axis), and the matrix Mh is used to correct the skin color S, the green color f and the luminance Y on the SfY coordinate system.

Incidentally, the matrix $Mn^{-1}$ is the inverse of the matrix Mn, i.e., an inverse matrix, which converts the SfY coordinate system into the RGB coordinate system.

Thus, S (skin color), f (green) and Y (luminance) are expressed in the form of a matrix as follows:

$$\begin{bmatrix} S \\ f \\ Y \end{bmatrix} = Mn \begin{bmatrix} R \\ G \\ B \end{bmatrix} \quad (3)$$

The matrix Mn (matrix $Mn^{-1}$) can now be determined as follows:

$$\begin{bmatrix} 100 \\ 0 \\ Y_1 \end{bmatrix} = Mn \begin{bmatrix} R_1 \\ G_1 \\ B_1 \end{bmatrix} \quad (4)$$

$$\begin{bmatrix} 0 \\ 100 \\ Y_2 \end{bmatrix} = Mn \begin{bmatrix} R_2 \\ G_2 \\ B_2 \end{bmatrix} \quad (5)$$

where two colors $C_1$ (skin color) and $C_2$ (green) which are to be color-corrected for emphasis by a user are respectively represented by $[(R_1, G_1, B_1) = C_1)]$ and $[(R_2, G_2, B_2) = C_2]$, and the luminances of $C_1$, $C_2$ are represented by $Y_1$, $Y_2$ respectively.

Since $S = f = 0$ in the above equation (3), an achromatic signal can be expressed by the following matrix:

$$\begin{bmatrix} 0 \\ 0 \\ Y_0 \end{bmatrix} = Mn \begin{bmatrix} R_0 \\ G_0 \\ B_0 \end{bmatrix} \quad (6)$$

where $R_0 = G_0 = B_0$ $$0.3R_0 + 0.59G_0 + 0.11B_0 = Y_0$$

Thus, the matrix Mn can be determined in accordance with the above equations (3), (4) and (5).

Prior to the description of the role of the matrix Mh, let's now demonstrate that even after the signals have been processed by the color-correcting matrices with the achromatic-signal axis being regarded as the center in a hue space, the signals thus processed represent achromatic signals.

By using the above equation (2), the equation (1) can be rewritten as follows:

$$\begin{bmatrix} R' \\ G' \\ B' \end{bmatrix} = Mn^{-1} \times Mh \times Mn \times \begin{bmatrix} R \\ G \\ B \end{bmatrix} \quad (7)$$

where $$Mh = \begin{bmatrix} h_{11} & h_{12} & 0 \\ h_{21} & h_{22} & 0 \\ h_{31} & h_{32} & 1 \end{bmatrix} \quad (8)$$

$$Mn = \begin{bmatrix} n_{11} & n_{12} & n_{13} \\ n_{21} & n_{22} & n_{23} \\ n_{31} & n_{32} & n_{33} \end{bmatrix} \quad (9)$$

Then, if the achromatic signals prior to the color correction are represented by ($R_0$, $G_0$, $B_0$) (where $R_0 = G_0 = B_0$), then the matrix Mn can be determined from the above equation (6) as follows:

$$Mn \times \begin{bmatrix} R_0 \\ G_0 \\ B_0 \end{bmatrix} = \begin{bmatrix} 0 \\ 0 \\ Y_0 \end{bmatrix} \quad (10)$$

where $Y_0 = n_{31}R_0 + n_{32}G_0 + n_{33}B_0$ Since $n_{11}+n_{12}+n_{13}=0$, $n_{21}+n_{22}+n_{23}=0$ and $n_{31}+n_{32}+n_{33}=1$ in the above equation (9), the equation (10) can be established.

The following matrix can be determined from the equations (7) and (10):

$$\begin{bmatrix} R' \\ G' \\ B' \end{bmatrix} = Mn^{-1} \times Mh \times \begin{bmatrix} 0 \\ 0 \\ Y_0 \end{bmatrix} \quad (11)$$

substituting the equation(8) for Mh in the equation (11) yields the following equation:

$$\begin{bmatrix} R' \\ G' \\ B' \end{bmatrix} = Mn^{-1} \times \begin{bmatrix} h_{11} & h_{12} & 0 \\ h_{21} & h_{22} & 0 \\ h_{31} & h_{32} & 1 \end{bmatrix} \times \begin{bmatrix} 0 \\ 0 \\ Y_0 \end{bmatrix} = Mn^{-1} \times \begin{bmatrix} 0 \\ 0 \\ Y_0 \end{bmatrix} \quad (12)$$

Since the matrix $Mn^{-1}$ is the inverse of the matrix Mn, i.e., the inverse matrix, the following equation can be derived form the equation (10):

$$Mn^{-1} \times \begin{bmatrix} 0 \\ 0 \\ Y_0 \end{bmatrix} = \begin{bmatrix} R_0 \\ G_0 \\ B_0 \end{bmatrix} \quad (13)$$

If the equation(13) is substituted for the right term in the equation (12), then the following equation is obtained:

$$\therefore \begin{bmatrix} R' \\ G' \\ B' \end{bmatrix} = \begin{bmatrix} R_0 \\ G_0 \\ B_0 \end{bmatrix} \quad (14)$$

Thus, when the signals prior to the color correction are achromatic signals, signals obtained by processing the signals by the color-correcting matrix circuits 14, 16, 18 also represent the same achromatic signals as those referred to above (achromatic invariable condition).

A description will now be made of the role of the aforementioned matrix Mh.

If the matrix Mh expressed in the equation (2) is represented by a three-row/three-column type matrix, then it can be expressed as follows:

$$Mc = Mn^{-1} \times \begin{bmatrix} h_{11} & h_{12} & h_{13} \\ h_{21} & h_{22} & h_{23} \\ h_{31} & h_{32} & h_{33} \end{bmatrix} \times Mn \quad (15)$$

Since the matrix Mn and the matrix $Mn^{-1}$ can be determined as described above, the color adjustment or correction can be carried out by the matrix Mh in the equation (15). The role of the matrix Mh is now as follows:

$h_{11} < 1.0$ (bring down chroma of $C_1$)
$h_{11} > 1.0$ (bring up chroma of $C_1$)
$h_{21} < 0$ (hue of $C_1 - f$ axis direction)
$h_{21} > 0$ (hue of $C_1 + f$ axis direction)
$h_{31} < 0$ (bring down brightness of $C_1$)
$h_{31} > 0$ (bring up brightness of $C_1$)
$h_{12} < 0$ (hue of $C_2 - S$ axis direction)
$h_{12} > 0$ (hue of $C_2 + S$ axis direction)
$h_{22} < 1.0$ (bring down chroma of $C_2$)
$h_{22} > 1.0$ (bring up chroma of $C_2$)
$h_{32} < 0$ (bring down brightness of $C_2$)
$h_{32} > 0$ (bring up brightness of $C_2$)

where $h_{13} = h_{23} = 0$, and $h_{33} = 1.0$ in terms of the achromatic invariable condition.

Figure 2:
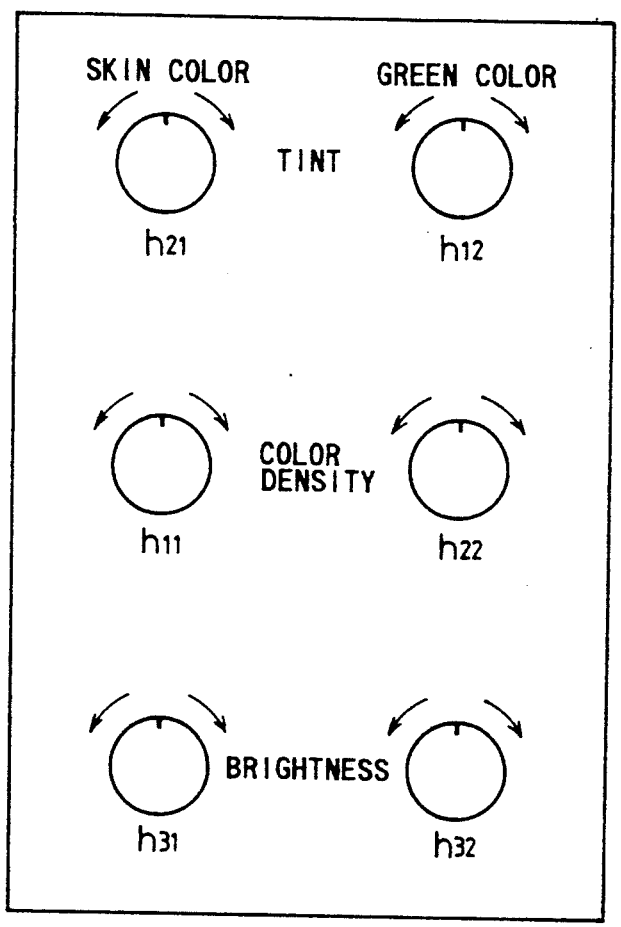

FIG. 2 shows the manner in which these, i.e., $h_{11}$, $h_{12}$, $h_{21}$, $h_{22}$, $h_{31}$, $h_{32}$ have been disposed as controls for the color adjustment. Thus, the color adjustment can be performed by such six controls. In this case, the user can place emphasis on correction of the hue, chroma and luminance of each of the specific two colors $C_1$ (skin color) and $C_2$ (green color). Incidentally, the green color does not exert an effect on the correction of the skin color. Therefore, the user can adjust the quality of an image with great ease.

A method of determining the matrix Mn will now be described specifically.

Two colors $C_1$, $C_2$ to be emphatically corrected are first selected. In this case, the skin color and the green color are selected as $C_1$ and $C_2$ respectively. For example, reproduced values suitable for visually perceiving the skin color as a desired skin color on a color monitor can be expressed in the following manner if the luminance, the amplitude of an image subcarrier and the phase angle are represented by $Y_1$, Ec and $\phi$ respectively.

$Y_1 = 0.7$ (70%)
$Ec = 0.24$
$\phi = 118°$

If $C_1 = (R_1, G_1, B_1)$ is determined from the above three conditions, then the following equation can be obtained as follows:

$$Ec = \sqrt{\frac{(R_1 - Y_1)^2}{(1.14)^2} + \frac{(B_1 - Y_1)^2}{(2.03)^2}} \quad (16)$$

$$\phi = \tan^{-1}\left[\frac{1.78 \times (R_1 - Y_1)}{B_1 - Y_1}\right] \quad (17)$$

$$Y_1 = 0.3 \times R_1 + 0.59 \times G_1 + 0.11 \times B_1 \quad (18)$$

Incidentally, a method of determining Ec, $Y_1$ and $\phi$ will be omitted because they are already known.

If the above respective values of $Y_1$, Ec and $\phi$ are substituted in the equations (16), (17) and (18), then $R_1$, $G_1$ and $B_1$ are determined as follows:

$R_1 = 0.86912$
$G_1 = 0.64385$
$B_1 = 0.53994$

The above values are normalized provided that 1.0 is regarded as 255.0. In this condition, $C_1$ is determined based on the values as follows:

$$C_1 = (R_1, G_1, B_1) = (221.6, 164.2, 137.7) \quad (19)$$

On the other hand, C$_2$ is determined based on colorimetric values (manufacturer's nominal values) obtained by the Macbeth color checker (manufactured by Macbeth GmbH in Germany).

Colorimetric values (x, y, Y) (CIE1931 standard colorimetric dye) indicative of the green-color portion, which has been obtained by the Macbeth color checker are represented as follows:

x=0.305
y=0.478
Y=23.4 (a C light source is used as a light source and the visual field is 2°)

The colorimetric values are substituted in the following equations (20), (21) and (22) to determine R$_2$, G$_2$, B$_2$.

$$X = \frac{x \times Y}{y} \quad (20)$$

$$Z = \frac{(1 - x - y) \times Y}{y} \quad (21)$$

$$\begin{bmatrix} R_2 \\ G_2 \\ B_2 \end{bmatrix} = \begin{bmatrix} 1.9106 & -0.5326 & -0.2883 \\ -0.9843 & 1.9984 & -0.0283 \\ 0.0584 & -0.1185 & 0.8985 \end{bmatrix} \times \begin{bmatrix} X \\ Y \\ Z \end{bmatrix} \quad (22)$$

Incidentally, the above equations (20), (21) and (22) will be omitted because they are already known.

Thus, R$_2$, G$_2$ and B$_2$ can be determined as follows:
R$_2$=0.12949
G$_2$=0.31797
B$_2$=0.07621

Then, the above values are normalized provided that 1.0 is taken as 255.0. In this condition, C$_2$ is determined based on these values as follows:

$$C_2 = (R_2, G_2, B_2) = (33.0, 81.1, 19.4) \quad (23)$$

If the values expressed in the equations (19) and (23) are substituted in the equations (4) and (5), then the matrix Mn and the matrix Mn$^{-1}$ can be determined as the following equations (24) and (25):

$$Mn = \begin{bmatrix} 1.2811 & -0.2824 & -0.9987 \\ -0.5502 & 1.7420 & -1.1918 \\ 0.3 & 0.59 & 0.11 \end{bmatrix} \quad (24)$$

$$Mn^{-1} = \begin{bmatrix} 0.4310 & -0.2688 & 1.0 \\ -0.1431 & 0.2122 & 1.0 \\ 0.4080 & -0.4048 & 1.0 \end{bmatrix} \quad (25)$$

As described above, the user can independently and freely change the hue, chroma and brightness of specific colors in the video printer. Even if a change in respective colors tints or tones is made in particular, it has no effect on other colors. It is also possible to easily adjust the quality of an image without any experience. In addition, a circuit configuration of the apparatus is also simple.

Having now fully described the invention, it will be apparent to those skilled in the art that many changes and modifications can be made without departing from the spirit or scope of the invention as set forth herein.

What is claimed is:

1. An apparatus for processing a video signal for color correction comprising:
    a first color-correcting matrix circuit for converting a signal of an RGB coordinate system based on an input video signal into a signal of an SfY coordinate system comprising a skin color S, a green color f, and a luminance Y;
    a second color-correcting matrix circuit for correcting said converted signal so that the colors S and f in said SfY coordinate system provide desired hue, chrominance, and luminance, respectively,
    said second color-correcting matrix circuit including coefficient adjusting means for altering matrix coefficients in said second color-correcting matrix circuit during correction of said converted signal; and
    a third color-correcting matrix circuit for converting said corrected converted signal into a signal of said RGB coordinate system.

2. The apparatus for processing a video signal for color correction according to claim 1, wherein said first through third color-correcting matrix circuits each comprise a three-row/three-column type matrix.

3. The apparatus for processing a video signal for color correction according to claim 1, wherein said third color-correcting matrix circuit comprises a matrix indicative of the inverse of said first color-correcting matrix circuit.

4. The apparatus for processing a video signal for color correction according to claim 1, wherein said second color-correcting matrix circuit outputs the same signal as an input signal applied thereto when the input signal is an achromatic signal.

* * * * *